(12) United States Patent
Seth et al.

(10) Patent No.: US 9,065,675 B2
(45) Date of Patent: Jun. 23, 2015

(54) MICROSTRUCTURED ADHESIVE ARTICLE

(75) Inventors: Jayshree Seth, Woodbury, MN (US); Marie A. Boulos, West St. Paul, MN (US); Janet A. Venne, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 151 days.

(21) Appl. No.: 12/988,114

(22) PCT Filed: Mar. 27, 2009

(86) PCT No.: PCT/US2009/038478
§ 371 (c)(1),
(2), (4) Date: Oct. 15, 2010

(87) PCT Pub. No.: WO2009/131792
PCT Pub. Date: Oct. 29, 2009

(65) Prior Publication Data
US 2011/0039067 A1    Feb. 17, 2011

Related U.S. Application Data

(60) Provisional application No. 61/047,000, filed on Apr. 22, 2008.

(51) Int. Cl.
B32B 9/00 (2006.01)
B32B 33/00 (2006.01)
H04L 12/40 (2006.01)

(52) U.S. Cl.
CPC ... H04L 12/40032 (2013.01); *Y10T 428/24355* (2015.01); H04L 12/40006 (2013.01); *H04L 2012/40254* (2013.01); *H04L 2012/4026* (2013.01)

(58) Field of Classification Search
CPC .................. H04L 12/40006; H04L 12/40032; H04L 2012/40254; H04L 2012/4026; Y10T 428/24355; Y10T 428/14
See application file for complete search history.

(56) References Cited

U.S. PATENT DOCUMENTS

| | | | |
|---|---|---|---|
| 5,154,974 A | 10/1992 | Norman et al. | |
| 5,520,978 A | 5/1996 | Boardman et al. | |
| 5,650,215 A * | 7/1997 | Mazurek et al. | 428/156 |
| 5,663,228 A | 9/1997 | Sasaki et al. | |
| 6,074,747 A | 6/2000 | Scholz et al. | |
| 6,123,890 A | 9/2000 | Mazurek et al. | |

(Continued)

FOREIGN PATENT DOCUMENTS

| | | |
|---|---|---|
| DE | 10 2005 061 766 | 6/2007 |
| JP | H05-732 | 1/1993 |

(Continued)

OTHER PUBLICATIONS

ASTM D 1894-63, "Standard Method of Test for Coefficients of Friction of Plastic Film", pp. 579-584.

(Continued)

*Primary Examiner* — Patricia L Nordmeyer
(74) *Attorney, Agent, or Firm* — Dena M. Ehrich

(57) ABSTRACT

Adhesive articles including transfer tapes and labels are described. The adhesive articles include a low elastic modulus adhesive on a microstructured release liner having a high coefficient of friction release surface. Improvements in die cut quality and razor slit edge quality are shown.

16 Claims, 5 Drawing Sheets

(56) References Cited

U.S. PATENT DOCUMENTS

| | | | |
|---|---|---|---|
| 6,312,800 B1 * | 11/2001 | Noguchi et al. | 428/354 |
| 6,521,309 B1 | 2/2003 | Chen et al. | |
| 6,524,675 B1 * | 2/2003 | Mikami et al. | 428/40.1 |
| 6,805,933 B2 * | 10/2004 | Patel et al. | 428/40.1 |
| 6,841,257 B2 | 1/2005 | Sasaki et al. | |
| 7,288,590 B2 | 10/2007 | Lechat et al. | |
| 2001/0051264 A1 | 12/2001 | Mazurek et al. | |
| 2001/0052384 A1 * | 12/2001 | Hannington | 156/239 |
| 2003/0017291 A1 * | 1/2003 | Fleming et al. | 428/40.1 |
| 2003/0082371 A1 | 5/2003 | Mazurek et al. | |
| 2006/0228480 A1 | 10/2006 | Lin | |
| 2007/0039271 A1 * | 2/2007 | Fleming et al. | 52/459 |
| 2007/0054080 A1 | 3/2007 | Hulteen et al. | |
| 2009/0053449 A1 * | 2/2009 | Hannington | 428/41.8 |
| 2010/0196664 A1 * | 8/2010 | Kuiper | 428/156 |

FOREIGN PATENT DOCUMENTS

| | | |
|---|---|---|
| JP | 2003-342533 | 12/2003 |
| WO | WO 00/69985 | 11/2000 |
| WO | WO 02/074877 | 9/2002 |
| WO | WO 2007/042772 | 4/2007 |
| WO | WO 2008/031751 | 3/2008 |
| WO | WO 2008/115371 | 9/2008 |
| WO | WO 2008/141001 | 11/2008 |

OTHER PUBLICATIONS

International Search Report from International Application No. PCT/US2009/038478, dated Jun. 19, 2009.

\* cited by examiner

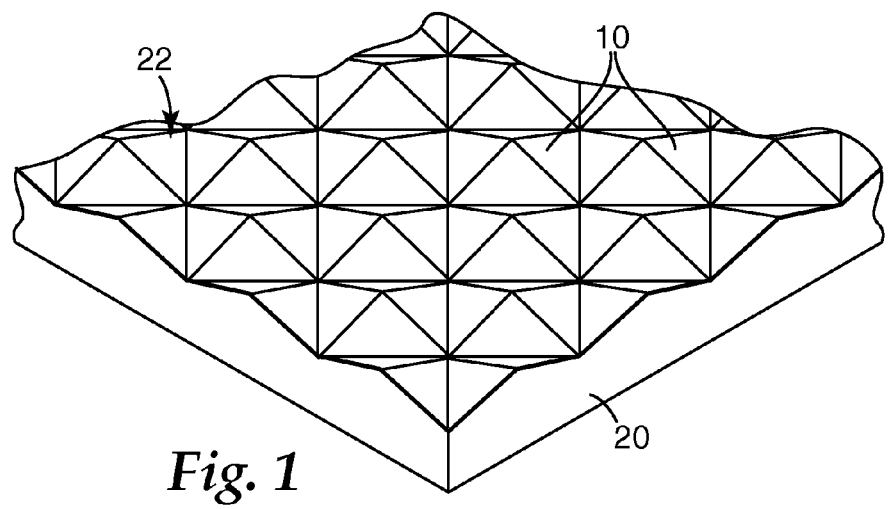
*Fig. 1*
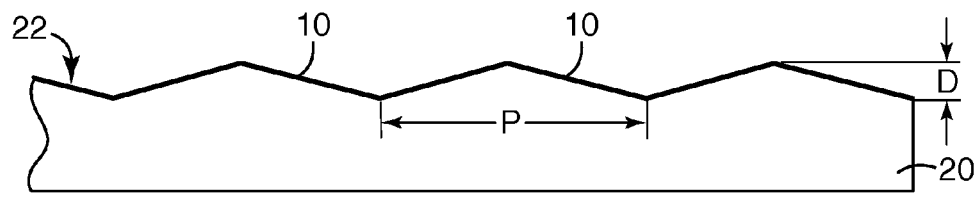
*Fig. 2*
*Fig. 3*  100 µm

100 μm 1 mm

US 9,065,675 B2

MICROSTRUCTURED ADHESIVE ARTICLE

CROSS REFERENCE TO RELATED APPLICATIONS

This application is a national stage filing under 35 U.S.C. 371 of PCT/US2009/038478, filed Mar. 27, 2009, which claims priority to U.S. Provisional Application No. 61/047,000, filed Apr. 22, 2008, the disclosures of which are incorporated by reference in their entirety herein.

FIELD

The present disclosure relates to adhesive articles including transfer tapes and labels. The adhesive articles include a low elastic modulus adhesive on a microstructured release liner having a high coefficient of friction release surface.

SUMMARY

Briefly, in one aspect, the present disclosure provides an adhesive article comprising a release liner comprising a microstructured release layer and an adhesive having a first major surface in contact with the release layer; wherein the release layer has an unstructured coefficient of friction of at least 0.4. In some embodiments, the adhesive has an elastic modulus at 20° C. of no greater than 50 kilopascals. In some embodiments, the adhesive has an elastic modulus at 50° C. of no greater than 20 kilopascals.

In some embodiments, the release layer comprises a silicone, e.g., a platinum-catalyzed silicone. In some embodiments, the release layer comprises a fluorochemical, a fluorosilicone, and/or a polyolefin.

In some embodiments, the adhesive comprises an acrylic copolymer. In some embodiments, the adhesive comprises a rubber. In some embodiments, the adhesive comprises a silicone.

In some embodiments, the microstructured release layer comprises a microstructure having a pitch of less than 500 microns. In some embodiments, the microstructured release layer comprises a microstructure having a depth of less than 25 microns.

In some embodiments, the adhesive article further comprises a substrate in contact with a second major surface of the adhesive.

The above summary of the present disclosure is not intended to describe each embodiment of the present invention. The details of one or more embodiments of the invention are also set forth in the description below. Other features, objects, and advantages of the invention will be apparent from the description and from the claims.

BRIEF DESCRIPTION OF THE DRAWINGS

FIG. 1 illustrates a microstructured release surface of a release liner according to some embodiments of the present disclosure.

FIG. 2 illustrates a cross-section of the exemplary release liner of FIG. 1.

FIG. 3 is a micrograph of the cut line of Comparative Example 4.

DETAILED DESCRIPTION

Figure 4:
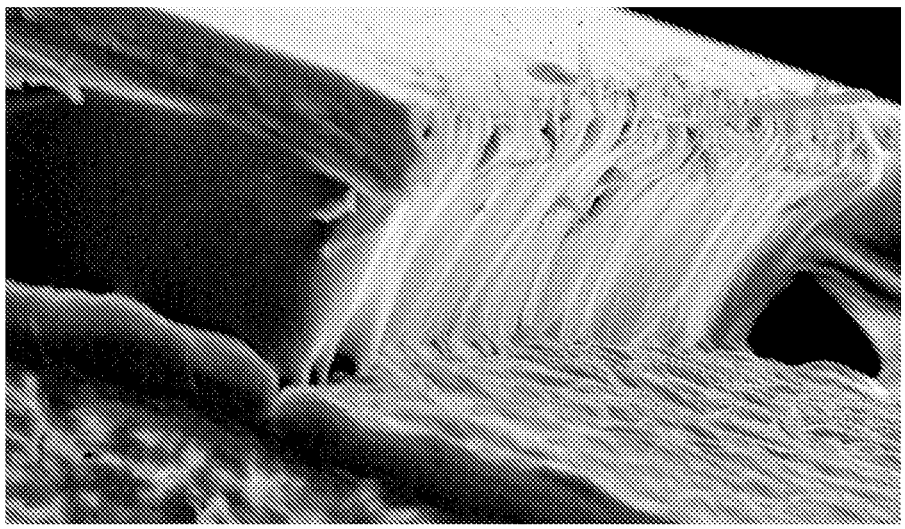
FIG. 4 is a micrograph of the cut line of Example 4.

Pressure sensitive adhesive (PSA) articles are useful in a wide variety of applications. Generally, there are two broad categories of adhesive articles. PSA articles in the first category, which includes adhesive transfer tapes (ATTs), typically comprise a free adhesive film supported by at least one release liner. In some embodiments, a second release liner may be present on the opposite side of the adhesive film. In some embodiments, a support layer (e.g., a film, cloth or scrim) may be embedded in the adhesive film. For example, in some embodiments, a support layer may be coated on both sides with the same or different adhesives. PSA articles in the second category, which includes tapes and labels, typically comprise a substrate permanently bonded to one surface of an adhesive film and a release liner temporarily adhered to the second surface of the adhesive. Typical substrates include paper, polymeric films, foils, and the like.

Regardless of the form they take, adhesive articles are frequently cut. Exemplary cutting operations include slitting (e.g., razor slitting) to obtain articles of a desired width, cross-cutting (e.g., guillotining) to obtain articles of a desired length, and die cutting (e.g., flatbed and rotary) to obtain articles of a desired shape. Other cutting operations include, e.g., perforating and punching.

In some converting operations, all layers of the adhesive article, including the release liner, are cut. In other operations, e.g., some modes of die cutting, the cutting (or crushing) edge of the die penetrates through the adhesive, while the release liner is typically not penetrated. This mode is often referred to as controlled depth die-cutting or kiss-cutting. This method is frequently used to convert label stocks where the cutting action cuts the permanently bonded substrate (typically referred to as the face stock) and the PSA layer but does not cut through the release liner.

During a cutting operation, the adhesive layer is separated along the cut line, e.g., along the path of the razor during slitting, or around the perimeter of the die during die cutting. The viscoelastic properties of the PSA often limit the ease and quality of a cut. For example, die-cutting involves relatively low deformation rates wherein the adhesive is pushed to the side of the cut. As the elasticity of the PSA increases, there is a greater tendency for the adhesive to recover from this deformation and flow back toward the cut line, which can result in undesirable adhesive "oozing."

Previous attempts to control adhesive ooze have focused on altering the chemistry of the adhesive itself (See, e.g., U.S. Pat. Nos. 5,154,974 (Norman, et al.); U.S. Pat. No. 5,663,228 (Sasaki, et al.); U.S. Pat. No. 6,841,257 (Sasaki, et al.); and U.S. Pat. No. 7,288,590 (Lechat, et al.).) However, such an approach may require an adhesive formulator to balance the properties of the adhesive to give both low ooze and adequate adhesion for the intended purpose. Unfortunately, the same viscoelastic properties of an adhesive that tend to result in undesirable ooze during cutting may be necessary to provide beneficial improvements when bonding to difficult to adhere substrates such as low surface energy materials.

The extent of adhesive oozing is also affected by the interaction between the adhesive layer and the release surface of the release liner. For example, using the same adhesive, oozing was found to be significantly greater after both slitting and die cutting when using a high coefficient of friction (COF) release surface as compared to low COF release surface. However, release force may also be affected by the COF of the release surface, as with some combinations of adhesive and release chemistry, a higher COF has been found to correlate with lower release forces. In fact, high COF release surfaces may be required to achieve acceptably low release forces when using softer (i.e., higher elasticity) adhesives; thus, compounding the adhesive ooze problems for such constructions.

The adhesive articles of the present disclosure include an adhesive in contact with the embossed, high coefficient of friction release surface of a release liner. The present inventors have discovered, if the release surface is microstructured, cleaner cutting (e.g., slitting and die cutting) can be achieved even when combining a low elastic modulus adhesive and a high COF release surface.

Generally, a release liner includes a base and a release surface. In some embodiments, the release surface may be integral to the base, e.g., low molecular weight olefin films may be used a release liner with some adhesives, and require no additional release coating. However, typical release liners include a release layer adhered to at least one surface of the base.

The composition of the base is not limited and any known material may be used. Exemplary base materials include paper, polycoated papers, and polymeric films. Typically, materials that can accept an embossed pattern may be used to simplify the processes involved in forming some adhesive articles of the present disclosure.

Generally, any known release chemistry which yields a high coefficient of friction surface when coated on a smooth surface may be used. Such surfaces often feel "rubbery" when you drag your finger across them. In contrast, low COF release surfaces tend to feel "slippery." Generally, the COF of the release surface will depend on the specific release chemistry and the curing process. Other factors, such as the method of application and the release layer thickness may also affect the COF.

Exemplary release chemistries include silicones, fluorosilicones, fluorochemicals, and non-silicone, non-fluorine based chemistries (e.g., polyolefins). These and other release formulations may be applied to the base using known means including solution (e.g., solvent) coating, 100% solids coating, and hot melt extrusion.

Generally, release layers having a higher crosslink density tend to have a higher COF. In formulations designed for solvent delivery, the major silicone component normally comprises polymers with molecular weights in excess of 100,000 that contain relatively fewer functional groups. Cured coatings of these systems have a relatively high molecular weight between crosslinks, and the segmental mobility and flexibility of these long, unrestricted lengths of polydimethylsiloxane are believed to be largely responsible for the low coefficient of friction of these coatings. For example, solvent-coated, tin-catalyzed silicones tend to have a low crosslink density and a correspondingly low COF.

In contrast, solvent-free systems are usually based on relatively highly functionalized silicone polymers having a molecular weight of 2,000 to 30,000. These formulations typically yield highly crosslinked, higher coefficient of friction (rubbery feeling) coatings when compared to solvent-delivered silicone systems. For example, solventless, platinum-catalyzed silicones generally have a higher crosslink density, and a correspondingly higher COF when compared to solvent-delivered systems.

In some embodiments, the COF of the release layer prior to microstructuring (i.e., the "unstructured COF") will be at least 0.4, in some embodiments, at least 0.5, at least 0.6, or even at least 0.8. The measured, unstructured COF of the release surface is generally higher than the measured COF of the structured release surface. However, the test method used to measure the COF does not account for the reduction in surface area of contact between the test apparatus and the embossed release surface. Thus, the actual COF experienced by the adhesive as it tends to relax and ooze across the surface of the embossed liner is believed to be more closely related to the unstructured COF.

Generally, any adhesive chemistry may be used. Exemplary adhesive chemistries include acrylics, rubbers (e.g., natural rubber and synthetic rubbers such as block copolymers (e.g., SIS, SBS, and SEBS)), silicones, and the like.

In applications, e.g., applications requiring bonding to a low surface energy material (e.g., polyethylene or polypropylene), softer, more aggressive adhesives may be desired. Generally, such adhesives are characterized as having a low modulus of elasticity. In some embodiments, adhesives having an elastic modulus (G') at 20° C. of no greater than 50 kilopascals (kPa) may be desired. In some embodiments, the elastic modulus at 20° C. may be no greater than 40 kPa, or even no greater than 30 kPa. In some embodiments, the elastic modulus at 50° C. may be no greater than 20 kPa, no greater than 15 kPa, or even no greater than 10 kPa.

EXAMPLES

TABLE 1

Liner descriptions.

| Liner | PCK Source | PCK | Silicone type | Coat weight (gm/m$^2$) |
|---|---|---|---|---|
| LIN-1 | Jencoat | HD/HD | Solvent Tin-catalyzed | 0.425 |
| LIN-2 | Jencoat | HD/HD | Solventless Platinum-cured | 1.303 |
| LIN-3 | Loparex | LD/HD | Solvent Tin-catalyzed | 0.385 |
| LIN-4 | Loparex | LD/HD | Solvent Tin-catalyzed | 0.428 |
| LIN-5 | Loparex | LD/HD | Solventless Platinum-cured | 1.271 |
| LIN-6 | Loparex | LD/HD | Solventless Platinum-cured | 1.345 |

Microstructured liners were made by embossing a pattern onto polycoated papers coated with various release chemistries. The liners are described in Table 1. The reported silicone coat weights were measured using an OXFORD LabX-3000 x-ray fluorescence gauge calibrated for silicone release coatings on polycoated papers. The liners were a 58 pound basis weight kraft paper with polyethylene layers on each side (i.e., polycoated kraft paper (PCK)). Some liners had high density polyethylene (HD) on both sides (HD/HD), while others had low density polyethylene (LD) on one side (LD/HD).

Microstructures were embossed on the liners. Pitch, P, is the distance from one microstructure to the same point on the adjacent microstructure. In some embodiments, a pitch of less than 1000 microns, e.g., less than 500 microns, or even less than 300 microns, may be desired. Depth, D, is the maximum impression of a microstructure. In some embodiments, a depth of at least 5 microns, e.g., at least 10 microns may be desired. In some embodiments, a depth of no greater than 50 microns, e.g., no greater than 35 microns, or even no greater than 30 microns may be desired.

Three microstructure patterns were used. "Pattern 1" and "Pattern 2" consisted of pyramidal microstructures, as illustrated in FIGS. 1 and 2. Pyramid-shaped microstructures, 10, are present in release surface 22 of release liner 20. The pitch, P, and depth, D, of the microstructures 10 are illustrated in the cross-sectional view shown in FIG. 2. "Pattern 1" had a pitch of 197 microns, and a depth of 13 microns. "Pattern 2" had a pitch of 292 microns, and a depth of 25 microns. "Pattern 3" consisted of a crosshatch of intersecting grooves having a pitch of 1270 microns.

A WABASH platen press was used to create samples of a microstructured liner. The following stack was created with the substrate to be embossed and the tool used for embossing: 36 cm by 36 cm (14 inch by 14 inch) cardboard piece/30 cm by 30 cm (12 inch by 12 inch) chrome-plated polished steel plate/50 micron (2.0 mil) thick polyester-based silicone release liner/nickel-plated embossing tool (embossing surface facing up)/substrate to be embossed (release surface in contact with the embossing surface))/50 micron (2.0 mil)) thick polyester-based silicone release liner/30 cm by 30 cm (12 inch by 12 inch) chrome-plated polished steel plate/36 cm by 36 cm (14 inch by 14 inch) cardboard piece. The area of contact between the embossing surface of the embossing tool and the release surface of the substrate was 25 cm by 25 cm (10 inches by 10 inches) yielding a contact area of 625 square centimeters (100 square inches).

The press was preheated to a temperature of 100° C. for embossing a release layer and an underlying low-density polyethylene (LD) layer of a PCK liner, or 110° C. for embossing a release layer and an underlying high-density polyethylene (HD) layer of a PCK liner. The stack was placed between the top and bottom platens, the platens were brought together, and the stack was pre-pressed for three minutes at 0.34 megapascals (MPa) (50 psi). The pressure was then increased to 2 MPa (300 psi) for LD-side embossing and 5.5 MPa (800 psi) for HD-side embossing. The stack was held under the high pressure for 3 minutes, and then cooled to at least 20° C. below press temperature while maintaining the high pressure before removing the samples from the press.

Alternatively, liners were microstructured in a roll-to-roll process by passing the liner between a heated rubber roll and an embossing roll. The rubber roll was heated to 110° C. The polycoated-surface of the release liner was also heated to a 110° C. before entering the nip between the rubber roll and the embossing roll. The liner traveled around approximately half of the embossing roll, and then onto a cold can which cooled the liner. The resulting microstructured liners were examined using a KEYENCE confocal microscope to confirm embossing quality.

Transfer tape samples were made by wet-casting a pressure-sensitive adhesive at a nominal thickness of 100 micrometers (4 mils) onto the microstructured liner and curing via ultraviolet light. This resulted in an adhesive layer having a first surface in contact with and conforming to the microstructured release surface, and a second, exposed surface that was substantially smooth.

The first adhesive (ADH-1) was a firmer adhesive containing a crosslinked acrylic copolymer of isooctyl acrylate and acrylic acid. ADH-2 was a softer adhesive and contained a crosslinked acrylic copolymer of isooctyl acrylate, isobornyl acrylate, and acrylic acid. ADH-2 was tackified with REGALREZ 6108. The glass transition temperature (Tg), elastic modulus (G') at 20° C. and 50° C., and the ratio of the loss modulus over the elastic modulus (tan δ) were measured for each of these adhesives These mechanical properties were measured using Dynamic Mechanical Analysis (DMA) in a parallel plate rheometer (RDA II, Rheometrics, Inc; Piscataway, N.J.) using a 16 mm diameter plate at a frequency of 1 radian/second and a maximum strain of 10%, while the sample was heated from room temperature to 200° C. at a rate of 2° C./minute. The results are reported in Table 2.

TABLE 2

Mechanical Properties of ADH-1 and ADH-2.

| Adhesive | Tg (° C.) | G' (kilopascals) 20° C. | 50° C. | Tan δ |
|---|---|---|---|---|
| ADH-1 | −14.4 | 62.71 | 33.87 | 1.3 |
| ADH-2 | −11.4 | 36.39 | 14.87 | 1.7 |

The resulting samples were evaluated for release surface coefficient of friction and adhesive release force. The samples were also converted (e.g., slit and die cut) and the quality of the cut, including the extent of adhesive ooze, was qualitatively assessed.

Coefficient of Friction. The COF of the release surface was determined using a Slip/Peel Tester commercially available from IMASS, Inc., Accord (Hingham), MA ("IMASS") under the trade designations "Model SP-102B-3M90" and "Model SP-2000" and following the procedure based on ASTM D 1894-63, subprocedure A. An approximately 25×15 cm (10×6 inch) area of a release liner was adhered to the platform of the Slip/Peel Tester such that the release layer was exposed. Care was taken to insure that the release layer was untouched, uncontaminated, flat, and free of wrinkles. Both the release layer and friction sled (wrapped with 3.2 mm thick medium density foam rubber, commercially available from IMASS under the trade designation "Model SP-101038") were blown with compressed air to remove any loose debris. The friction sled was placed on the release layer and the chain attached to the sled was affixed to the force transducer of the Slip/Peel Tester. The platform of the Slip/Peel Tester was set in motion at a speed of 15 cm/min (6 in/min), thereby dragging the friction sled across the release layer surface. The instrument calculated and reported the average kinetic friction force, omitting the static friction force. The kinetic coefficient of friction was obtained by dividing the kinetic friction force by the weight of the friction sled.

Die cutting. Samples were prepared by laminating a 38 micron (1.5 mil) thick PET film to the exposed (substantially smooth) surface of the adhesive. The laminates were control-depth die cut on a MARK ANDY MODEL 830 press. The tooling of the rotary die generated three labels across the width of the laminate. Each label was 3.2 cm (1.25 inches) wide by 5.7 cm (2.25 inches) long. The matrix surrounding the labels was peeled away to leave rows of labels adhered to the release liner.

Die cut samples were examined using scanning electron microscopy (SEM). Each cut was rated on a scale of 1-5, with 5 being the best. Ratings were assigned based on the view at the cut edge and the extent of adhesive ooze. Clear pull back from the cut line was assigned a value of 5, while a value of 1 indicated significant adhesive extending over the cut-line. Reported results are the average of several observations.

Samples were prepared using two different high COF liners, two microstructure patterns and two adhesives. The results are summarized in Table 3. For each combination of liner, microstructure pattern, and adhesive, the die cut quality was improved relative to the unstructured comparative examples.

Figure 5:
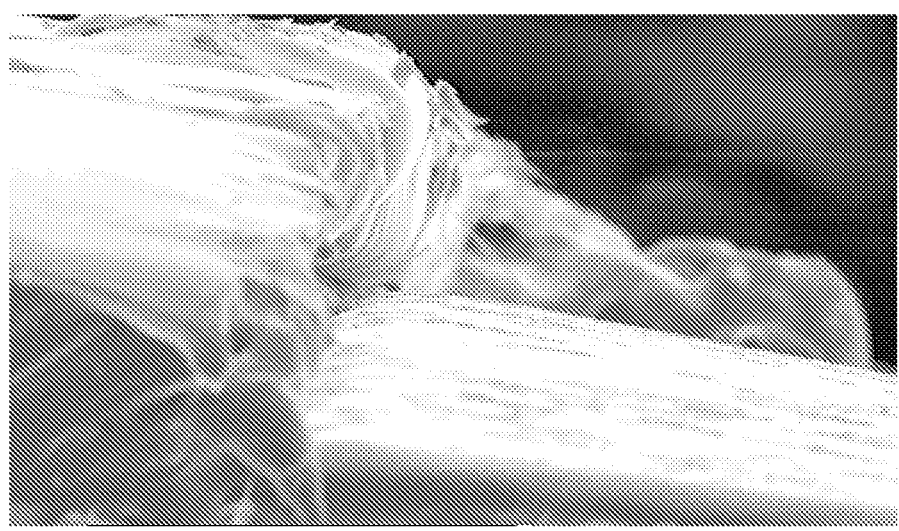
FIG. 5 is a micrograph of the cut line of Comparative Example 8.
Figure 6:
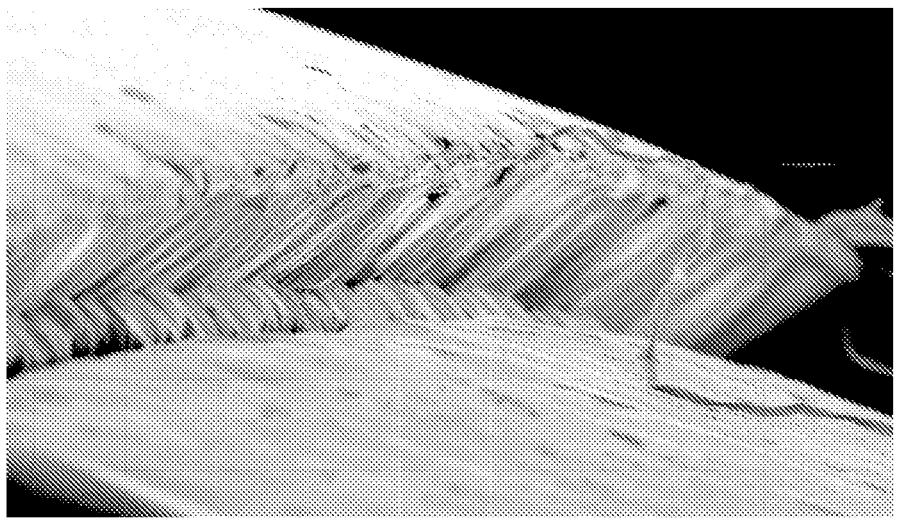
FIG. 6 is a micrograph of the cut line of Example 8.

Examples of cut-lines obtained with structured and unstructured liners are shown in FIGS. 3-6. FIG. 3 shows the adhesive ooze observed along the die cut line for the high COF release surface of Comparative Example 4, which received a die-cut quality rating of 1. FIG. 4 shows the improvement observed with Example 4 when the same liner is microstructured. Example 4 received die-cut quality rating of 3.5. Similarly, FIG. 5 shows the adhesive ooze observed for the low COF release surface of Comparative Example 8, which received a die-cut quality rating of 2.5. FIG. 6 shows the improvement observed with Example 8 when the same liner is microstructured. Example 8 received a die-cut quality rating of 4.5.

TABLE 3

Test results obtained with high COF liners.

| Example | PSA | Liner | Structure | COF | Die cut quality |
|---|---|---|---|---|---|
| CE-1 | ADH-1 | LIN-2 | none | 0.90 | 2 |
| 1 | ADH-1 | LIN-2 | Pattern 2 | 0.52 | 3.5 |
| CE-2 | ADH-1 | LIN-5 | none | 0.66 | 1 |
| 2 | ADH-1 | LIN-5 | Pattern 1 | 0.40 | 3 |
| CE-3 | ADH-2 | LIN-2 | none | 0.90 | 1 |
| 3 | ADH-2 | LIN-2 | Pattern 2 | 0.52 | 2.5 |
| CE-4 | ADH-2 | LIN-5 | none | 0.66 | 1 |
| 4 | ADH-2 | LIN-5 | Pattern 1 | 0.40 | 3.5 |

Additional samples were prepared using several different low COF liners. As shown in Table 4, the die cut quality was improved for the microstructured samples relative to the unstructured comparative examples, except for the samples prepared with LIN-4, which used Pattern 3 having a pitch of 1270 microns.

TABLE 4

Test results obtained with low COF liners.

| Example | PSA | Liner | Structure | COF | Die cut quality |
|---|---|---|---|---|---|
| CE-5 | ADH-1 | LIN-1 | none | 0.30 | 3 |
| 5 | ADH-1 | LIN-1 | Pattern 2 | 0.23 | 5 |
| CE-6 | ADH-1 | LIN-3 | none | 0.31 | 4 |
| 6a | ADH-1 | LIN-3 | Pattern 1 | | 4.5 |
| 6b | ADH-1 | LIN-3 | Pattern 2 | 0.27 | 5 |
| CE-7 | ADH-1 | LIN-6 | none | 0.20 | 3.5 |
| 7 | ADH-1 | LIN-6 | Pattern 1 | | 4 |
| CE-8 | ADH-2 | LIN-3 | none | 0.31 | 2.5 |
| 8 | ADH-2 | LIN-3 | Pattern 2 | 0.27 | 4.5 |
| CE-9 | ADH-1 | LIN-4 | none | 0.29 | 2.5 |
| CE-10 | ADH-1 | LIN-4 | Pattern 3 | | 1.5 |

Roll prototypes were subjected to razor slitting and a stack cut from the edge was examined under using a SEM. Each sample used ADH-2, the softer adhesive. Comparative samples were prepared using an unstructured liner using a solventless, platinum-cured silicone release system (LIN-2), and an unstructured liner coated with a low COF, solvent-based silicone release system (LIN-3). The rolls were razor slit using a blade angle of 90°. It is generally known that higher blade angles can lead to greater adhesive picking. Therefore, this high blade angle was used to aid in discriminating between the cut edge qualities of the various samples.

Figure 7:
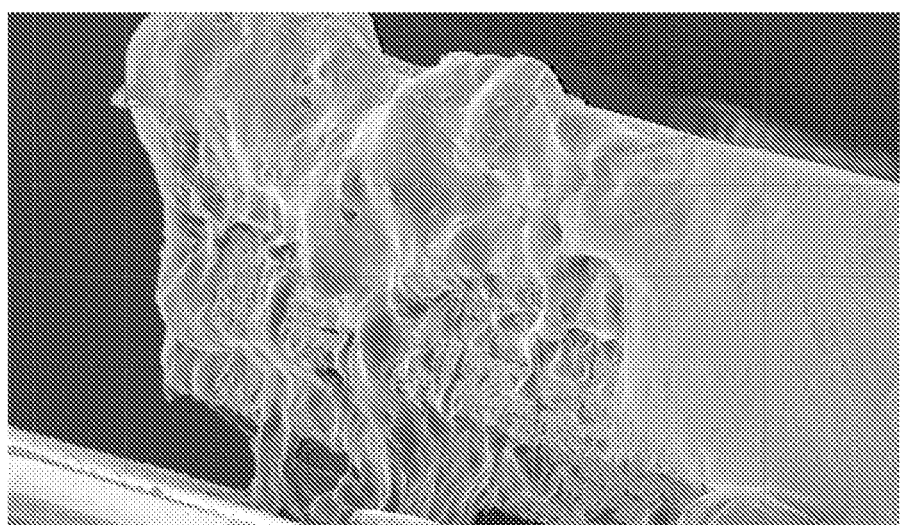
FIG. 7 is a micrograph of the slit edge of a roll of Comparative Example 4.
Figure 8:
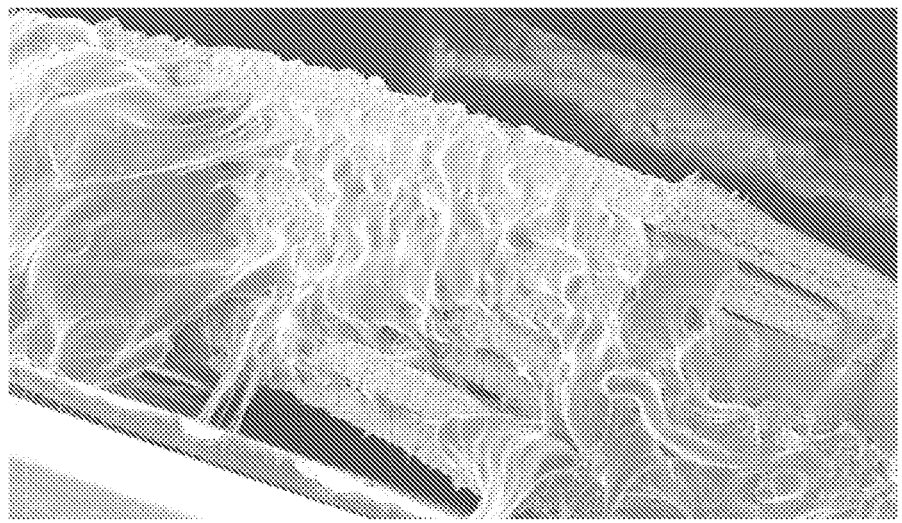
FIG. 8 is a micrograph of the slit edge of a roll of Comparative Example 8.
Figure 9:
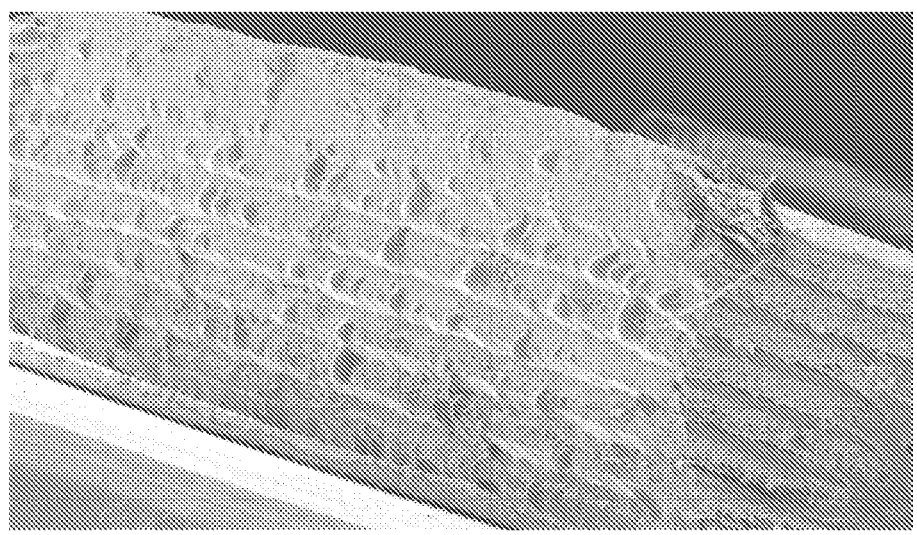
FIG. 9 is a micrograph of the slit edge of a roll of Example 8.

As shown in FIG. 7 (Comparative Example 3) and FIG. 8 (Comparative Example 8), there was significant adhesive ooze with both comparative samples, and edge quality was poor. In addition, the slit edge was extremely sticky to the touch. An example according to some embodiments of the present disclosure was prepared by coating the same adhesive (ADH-2) on a microstructured liner (Example 8). As shown in FIG. 9, the use of the microstructured liner resulted in a marked improvement in edge quality and a significant reduction in adhesive ooze compared to the flat liners.

Figure 10:
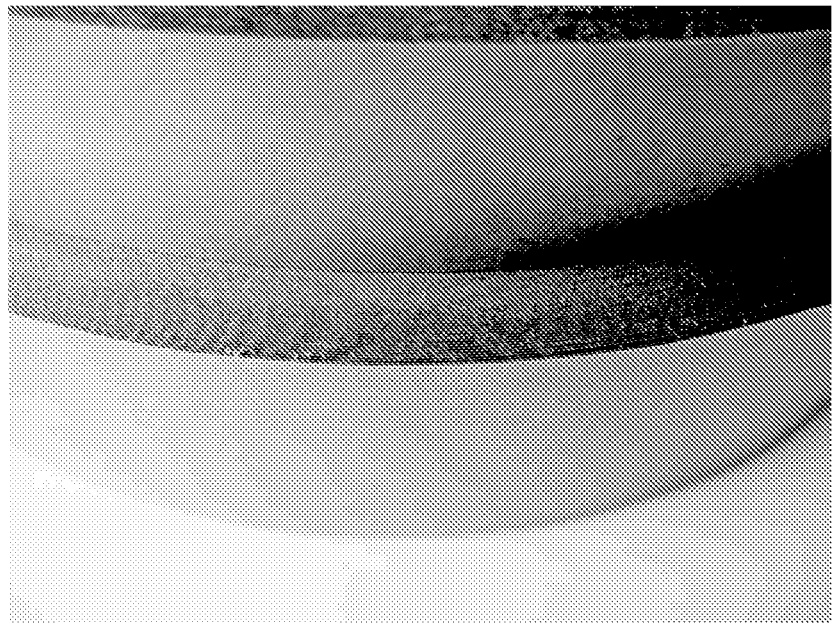
FIG. 10 is a picture of the slit edge of a roll of Example 9.
Figure 11:
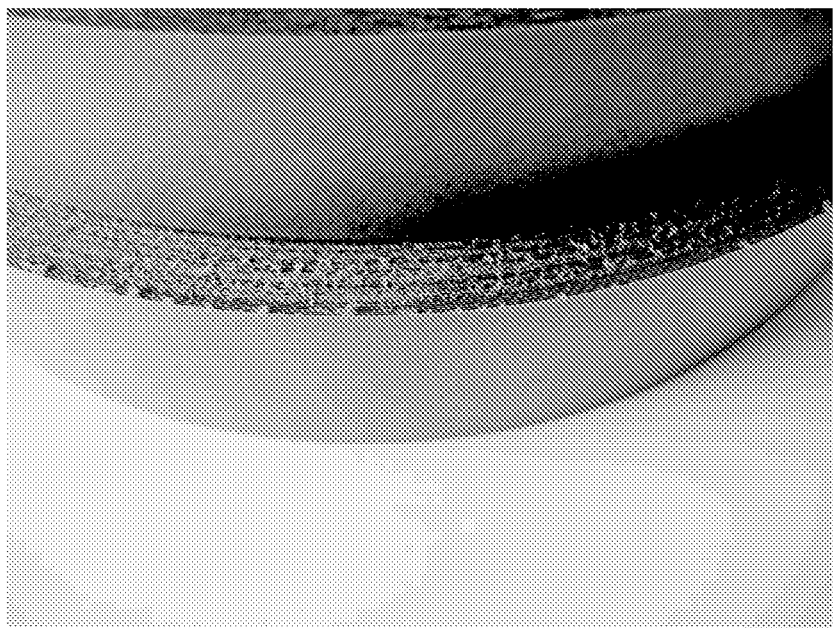
FIG. 11 is a picture of the slit edge of a roll of Comparative Example 11.

Additional roll prototypes were razor slit and the edge was examined. Each sample used ADH-2, the softer adhesive, and LIN-5, which has a solventless, platinum-cured silicone release layer. Comparative Example 11 was prepared using LIN-5 without a pattern, while Example 9 was prepared using LIN-5 with PATTERN-2. The rolls were razor slit using a blade angle of 90°. Comparing FIG. 10 (Example 9, structured liner) with FIG. 11 (Comparative Example 11, unstructured liner), the sample prepared using the microstructured liner exhibited a marked improvement in edge quality.

The effect of microstructure on another high COF release coating was evaluated. The liner had fluorosilicone release coat weight of 0.917 grams/square meter and an unstructured COF of 1.06. The fluorosilicone was coated on to a HD/HD PCK substrate obtained from Loparex. The liner was microstructured using Pattern 2, resulting in a structured COF of 0.70. ADH-2 was applied and samples were die-cut. The die-cut quality rating of the unstructured sample was 3.5. The addition of the microstructure improved the die-cut quality rating to 4.

The effect of microstructuring the release surface on the release properties was evaluated using the following Release Test. A 25 micron (1 mil) thick sheet of polyester (PET) was laminated to the exposed (substantially smooth) surface of the adhesive, i.e., the surface of the adhesive opposite the release liner. After the laminated samples were conditioned, two or three samples were tested to determine the force required to remove the PET/adhesive laminate from the release surface of the release liner (i.e., the "release force"). The release force was measured using an IMASS tester peeling at 180 degrees at a rate of 230 cm per minute (90 inches per minute). As shown in Table 5, the microstructure had no significant detrimental impact on release force.

TABLE 5

Effect of microstructure on release force.

| | | | | Release in grams/2.5 cm (grams/inch) | | |
|---|---|---|---|---|---|---|
| Example | PSA | Liner | Structure | 7 days Room temp. | 7 days 70° C. | 14 days 70° C. |
| CE-4 | ADH-2 | LIN-5 | none | | 24.4 | |
| 4 | ADH-2 | LIN-5 | Pattern 1 | | 28 | |
| CE-6 | ADH-1 | LIN-3 | none | 42.2 | | 55 |
| 6a | ADH-1 | LIN-3 | Pattern 1 | 43.4 | | 57.6 |

Various modifications and alterations of this invention will become apparent to those skilled in the art without departing from the scope and spirit of this invention.

What is claimed is:

1. An adhesive article comprising a release liner comprising a microstructured release layer, an adhesive having a first major surface in contact with the release layer, and a substrate in contact with a second major surface of the adhesive; wherein the release layer has an unstructured coefficient of friction of at least 0.4, wherein the microstructured release layer comprises a microstructure having a depth of at least 5 microns, and wherein the unstructured coefficient of friction is measured according to ASTM D 1894-63, sub-procedure A, wherein the substrate comprises a low surface energy material, wherein the adhesive has an elastic modulus at 20° C. of no greater than 50 kilopascals, wherein the release layer comprises a fluorochemical or a platinum-catalyzed silicone.

2. The adhesive article of claim 1, wherein the release layer has an unstructured coefficient of friction of at least 0.6.

3. The adhesive article of claim 2, wherein the release layer has an unstructured coefficient of friction of at least 0.8.

4. The adhesive article of claim 1, wherein the adhesive has an elastic modulus at 20° C. of no greater than 40 kilopascals.

5. The adhesive article of claim 4, wherein the release layer has an unstructured coefficient of friction of at least 0.6.

6. The adhesive article of claim 5, wherein the adhesive has an elastic modulus at 50° C. of no greater than 20 kilopascals.

7. The adhesive article of claim 1, wherein the release layer comprises a silicone.

8. The adhesive article of claim 1, wherein the release layer comprises a fluorosilicone.

9. The adhesive article of claim 1, wherein the release layer comprises a polyolefin.

10. The adhesive article of claim 1, wherein the adhesive comprises an acrylic copolymer.

11. The adhesive article of claim 1, wherein the adhesive comprises a rubber.

12. The adhesive article of claim 1, wherein the adhesive comprises a silicone.

13. The adhesive article of claim 1, wherein the microstructured release layer comprises a microstructure having a pitch of less than 500 microns.

14. The adhesive article of claim 1, wherein the microstructured release layer comprises a microstructure having a depth of less than 25 microns.

15. The adhesive article of claim 1, wherein the release layer comprises a platinum-catalyzed silicone and has an unstructured coefficient of friction of at least 0.6, and wherein the adhesive comprises a crosslinked acrylic copolymer and has an elastic modulus at 20° C. of no greater than 40 kilopascals.

16. The adhesive article of claim 15, wherein the microstructured release layer comprises a microstructure having a pitch of less than 500 microns and a depth of less than 25 microns.

* * * * *